United States Patent [19]
Voye, Jr.

[11] Patent Number: 5,196,071
[45] Date of Patent: Mar. 23, 1993

[54] METHOD AND APPARATUS FOR DROSS FREE BURNING OF SLABS

[75] Inventor: Joseph L. Voye, Jr., Portage, Ind.

[73] Assignee: Bethlehem Steel Corporation, Bethlehem, Pa.

[21] Appl. No.: 729,341

[22] Filed: Jul. 12, 1991

[51] Int. Cl.5 ............................................ B23K 37/04
[52] U.S. Cl. ...................................... 148/194; 266/65
[58] Field of Search .................... 266/48, 65; 148/9 R, 148/194; 409/301

[56] References Cited

U.S. PATENT DOCUMENTS

| | | | |
|---|---|---|---|
| 3,944,203 | 3/1976 | Brekelbaum | 266/65 |
| 4,357,817 | 11/1982 | Linsinger | 72/71 |
| 4,610,586 | 9/1986 | Langeder | 409/301 |
| 4,859,126 | 8/1989 | Mancuso | 266/48 |
| 4,874,274 | 10/1989 | Mancuso | 266/48 |
| 4,988,843 | 1/1991 | Cornell et al. | 219/100 |

FOREIGN PATENT DOCUMENTS

2614488 10/1976 Fed. Rep. of Germany ........ 266/65

Primary Examiner—Scott Kastler
Attorney, Agent, or Firm—Shlesinger Arkwright & Garvey

[57] ABSTRACT

A method and torch-cutting apparatus for slabs to prevent dross from forming on the underside of the slabs in the area of a cut includes a device to be positioned beneath a slab. The device applies a tight clamping pressure to the underside of the slab in the area of the cut to thereby prevent dross from flowing laterally and forming on the underside of the slab in the area of the cut during the cutting operation.

30 Claims, 6 Drawing Sheets

METHOD AND APPARATUS FOR DROSS FREE BURNING OF SLABS

FIELD AND HISTORICAL BACKGROUND OF THE INVENTION

The present invention is directed to torch-cutting of slabs. More particularly, the present invention is directed to the cutting of slabs wherein the formation of dross along the cut edges and underside of the slabs is prevented during the cutting operation.

Conventionally, metallic slabs and the like are cut by using a suitable device, such as a flame torch. However, during the cutting operation, dross is formed along the cutting edge of the slabs and on the underside thereof. (Dross may be defined as the burner splash and metal removed from the burn that adheres to the bottom edge of the slab.) This leads to the slab pieces that are not neat and therefore less desirable. Therefore, it becomes necessary to remove dross from slab pieces subsequent to the cutting operation. In the industry, this is achieved by impact-breaking or shearing the dross formed on the slab pieces. Examples of the conventional devices and methods are disclosed in U.S. Pat. Nos. 4,357,817 and 4,610,586.

The conventional methods and devices, however, are directed to dross removal subsequent to the cutting operation, which requires subjecting the cut pieces to a new set of treatment and significantly raises the manufacturing costs of cutting slabs. Thus, it is desirable that the dross be removed before the slab is rolled-off the casting machine, if defect-free and economically made pieces are desired.

Therefore, there is a need in the industry for a device and method by which the formation of dross on the underside of the cut pieces is prevented during the cutting operation.

OBJECTS AND SUMMARY OF THE INVENTION

The principal object of the present invention is to provide a method and apparatus for torch cutting slabs to prevent dross from forming on the underside of the slabs in the area of the cut.

Another object of the present invention is to provide method and apparatus for torch cutting slabs which produce defect-free slab pieces.

Yet another object of the present invention is to provide a method and apparatus for torch cutting slabs which save time and substantially reduce labor and other costs associated with the cutting of slabs.

An additional object of the present invention is to provide a method and apparatus for torch cutting slabs wherein the pieces produced do not have dross deposit thereon. Therefore, it is not necessary to subject the cut pieces to yet another set of treatment for the dross removal.

Yet an additional object of the present invention is to provide a method and apparatus for torch cutting slabs wherein the method can be easily carried out by using the inventive apparatus.

Still yet additional object of the present invention is to provide an apparatus for torch cutting slabs which can be easily and effectively incorporated in the conventional slab casting and cutting machines.

In summary, the main object of the present invention is to provide a method and apparatus for torch cutting slabs wherein the formation of dross on the flame cut edges and the underside of the slab pieces is prevented.

BRIEF DESCRIPTION OF THE DRAWINGS

The above and other objects and advantages and novel features of the present invention will become apparent from the following detailed description of the preferred embodiment of the invention illustrated in the accompanying drawings, in which.

DETAILED DESCRIPTION OF THE INVENTION

Figure 1:
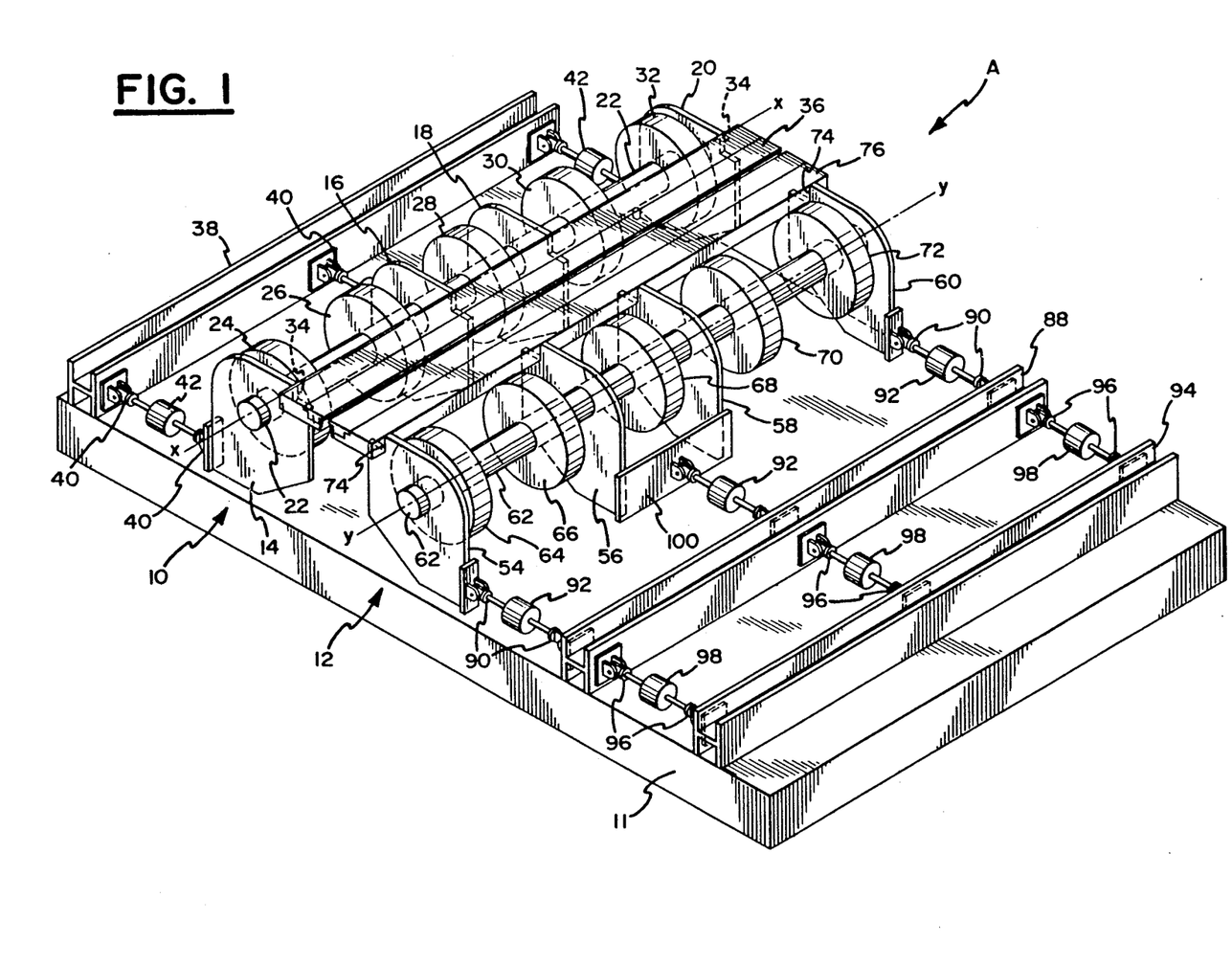
FIG. 1 is a perspective view of the slab cutting apparatus in accordance with the present invention.

As best shown in FIG. 1, the apparatus A of the invention includes a pair of laterally spaced clamp assemblies 10 and 12 mounted on suitable support 11. It should be noted that the apparatus A normally would be mounted on a table (not shown) conventionally used in flame-burning of slabs.

Figure 2:
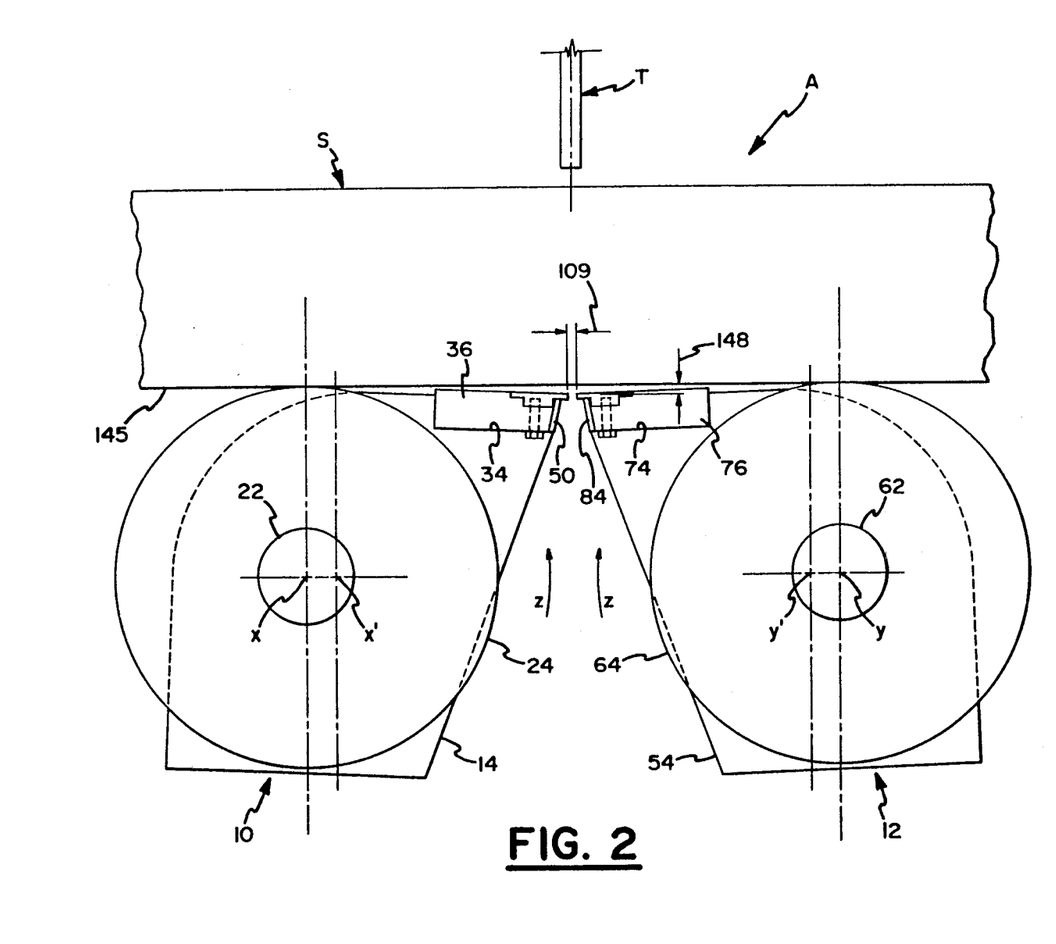
FIG. 2 is a partial enlarged front elevational view of the apparatus of FIG. 1, shown with a slab and the clamps in unclamped positions.
Figure 3:
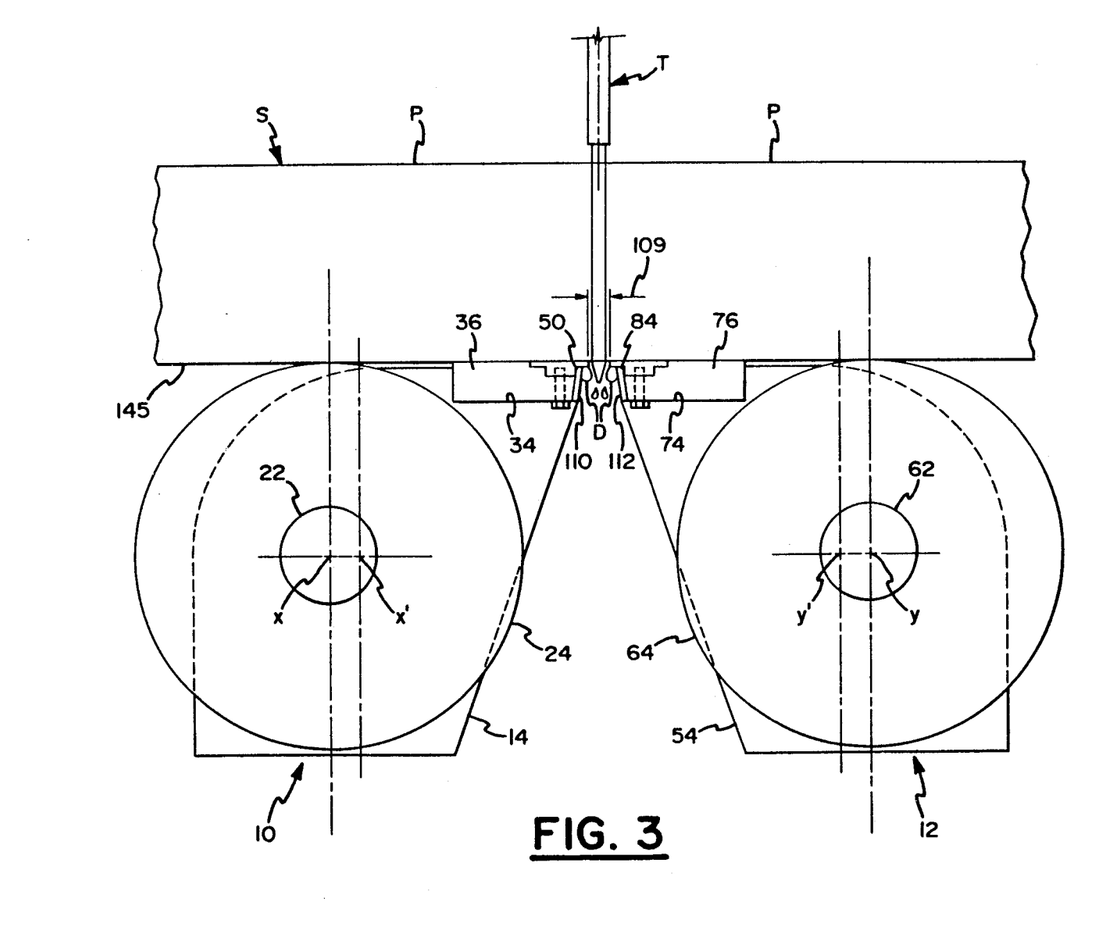
FIG. 3 is a review similar to FIG. 2, showing the clamps in the clamped position and the burner torch cutting through the slab.

The clamp assembly 10 includes four vertically aligned clamp plates 14, 16, 18 and 20, pivotably mounted on shaft 22. The longitudinal axis x of shaft 22 is eccentric to the central longitudinal axis x' of plates 14, 16, 18 and 20, best shown in FIGS. 2 and 3. A set of five slab-supporting rollers 24, 26, 28, 30 and 32, are rigidly mounted on shaft 22 and are interplaced between clamp plates 14, 16, 18 and 20. As best shown in FIGS. 2-3, each clamp plate 14, 16, 18 and 20 is provided with a cut-out step 34 for rigidly supporting thereon dross collecting plate 36 which extends generally parallel to and the length of shaft 22.

The clamp plates 14, 16, 18 and 20 are connected to an H-beam 38 by rigid joints 40 and three hydraulic cylinders 42. The H-beam 38 remains fixed on the table and cylinders 42, upon actuation, pivot clamp assembly 10.

Figure 5:
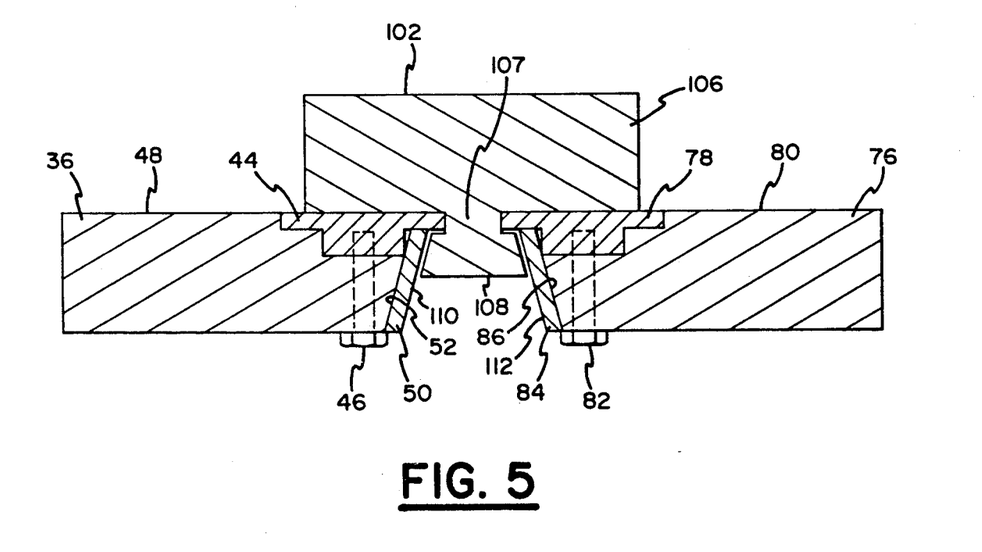
FIG. 5 is a partial enlarged sectional view taken along line 5—5 of FIG. 4.

The dross collecting plate 36, as best shown in FIG. 5, has mounted thereon a replaceable die plate 44 by screw-fasteners 46 along the top surface 48 thereof. Another replaceable plate 50 is mounted on the side 52 of dross collecting plate 36. The replaceable plates 44 and 50 are preferably made of bronze as it is easier to remove the dross deposit D therefrom.

The clamp assembly 12 is a mirror-image of assembly 10 and includes clamp plates 54, 56, 58 and 60 pivotably mounted on shaft 62, and are placed in opposite alignment with clamp plates 14, 16, 18 and 20, respectively, of clamp assembly 10. Likewise, five slab-supporting rollers 64, 66, 68, 70 and 72 are rigidly mounted on shaft 62 and are also placed in opposite alignment with rollers 24, 26, 28, 30 and 32, respectively, of clamp assembly 10.

The clamp plates 54, 56, 58 and 60 are also provided with a cut-out step 74 for supporting thereon a dross collecting plate 76 disposed in parallel and opposite alignment with dross collecting plate 36. As best shown in FIGS. 2 and 3, the axis y of shaft 62 is eccentric to the longitudinal axis y' of clamp plates 54, 56, 58 and 60.

As best shown in FIG. 5, dross collecting plate 76 also has a replaceable die plate 78 mounted on the top surface 80 thereof by screw fasteners 82. Another replaceable plate 84 is mounted on the side 86 of dross collecting plate 76. The replaceable plates 78 and 84 are also made of bronze for easy removal of dross D therefrom.

Like clamp assembly 10, the clamp plates 54, 56, 58 and 60 are also connected to an H-beam 88 by rigid joints 90 and three hydraulic cylinders 92. As best shown in FIG. 1, a supplemental, outer H-beam 94 is connected to H-beam 88 by rigid joints 96 and three hydraulic cylinders 98. The outer H-beam 94 drives the entire clamp assembly 12, including the inner H-beam 88. It should be noted that it is within the scope of this invention to provide additional cylinders and H-beams or to vary the numbers thereof on either side of the clamp assemblies 10 and 12, as needed.

As shown in FIG. 1, the clamp plates 56 and 58, lying inwardly of clamp plates 54 and 60, pivot together as they are mechanically fastened together by a horizontal plate 100. The clamping plates 16 and 18 of clamp assembly 10 are also joined together by a similar plate 100 and pivot together when the corresponding cylinder 42 is actuated.

The clamp assemblies 10 and 12 are, therefore, disposed in a generally opposed symmetrical relationship such that their movements can be easily coordinated. Although not shown, a hydraulic mechanism for rotating the slab-supporting rollers of each of the clamp assemblies 10 and 12 would also be provided.

As shown in FIG. 5, a cleaning device 102, connected to a hydraulic cylinder 104, is provided for cleaning dross D that adheres to plates 50 and 84, and plates 44 and 78, FIG. 3. The cleaning device 102 includes upper portion 106 that slides across the top surfaces 48 and 80 of dross collecting plates 36 and 76, respectively, and a central lower wedge portion 108 that slides across the surfaces 110 and 112 of side plates 50 and 84. The upper and lower portions 106 and 108 are connected by neck 107 which removes any dross that is deposited on plates 44 and 78 and extends into clearance space 109 therebetween.

FIGS. 6-9 illustrate another embodiment of the apparatus AA of the present invention which can be used in conjunction with a conventional continuous caster torch cut-off machine C (details omitted for clarity).

Figure 6:
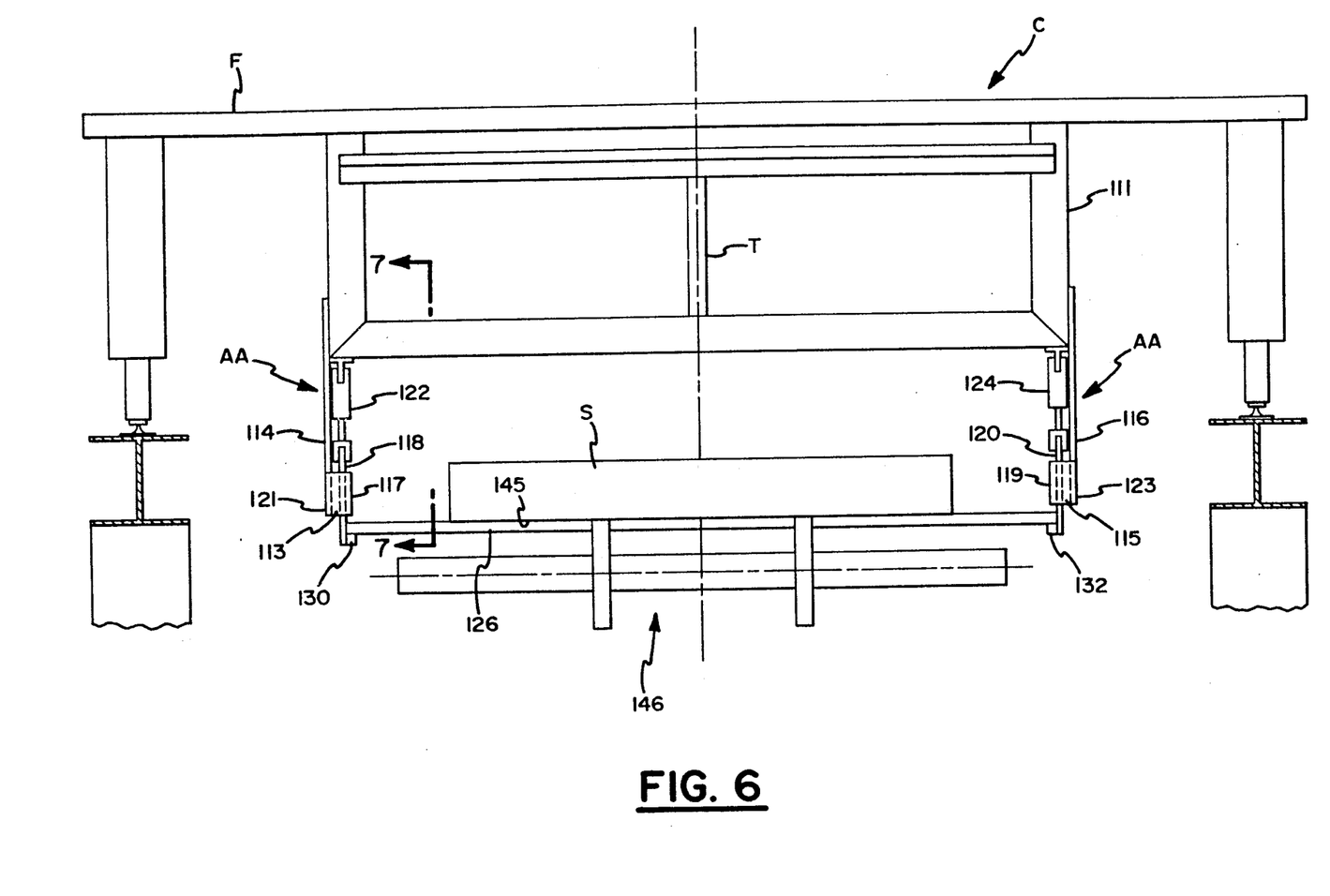
FIG. 6 is a schematic front elevational view of a continuous caster torch cut-off machine with the slab cutting apparatus of the invention.

As shown in FIG. 6, a continuous caster torch cut-off machine C includes a torch-cutting assembly 111 suspended from support frame F which has mounted thereto support panels 114 and 116. The panels 114 and 116 include guillotine members 118 and 120, respectively, which are suspended downwardly in parallel relationship thereto and extend through recesses 113 and 115 defined by panels 114 and 116 and C-shaped yokes 117 and 119 mounted to lower ends 121 and 123 of the panels, FIGS. 6-9. Hydraulic cylinders 122 and 124 drive guillotine members 118 and 120 up and down, as desired.

Figure 7:
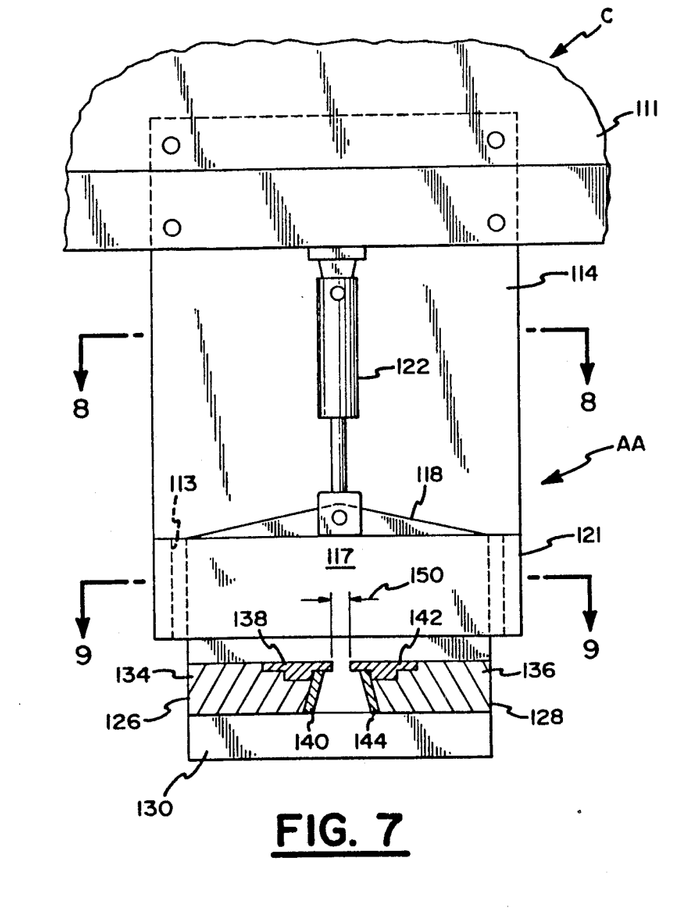
FIG. 7 is a partial enlarged sectional view taken along line 7—7 of FIG. 6.
Figure 8:
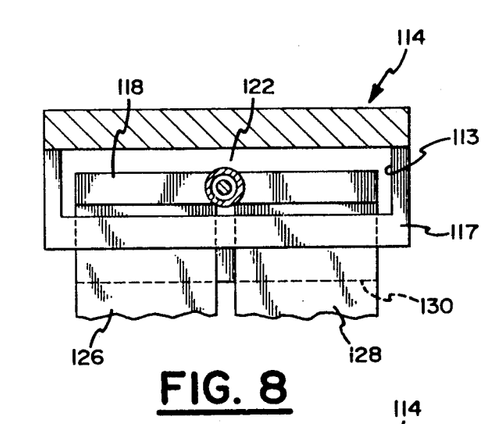
FIG. 8 is a partial sectional view taken along line 8—8 of FIG. 7.
Figure 9:
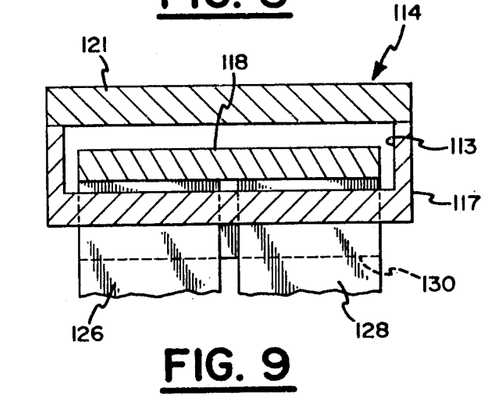
FIG. 9 is a partial sectional view taken along line 9—9 of FIG. 7.

As best shown in FIG. 7, two laterally spaced clamps 126 and 128 extend between guillotine members 118 and 120 and are supported on horizontal brackets 130 and 132. The clamps 126 and 128 essentially have the configuration of dross collecting plates 134 and 136, respectively, which are similar in structure to the dross collecting plates 36 and 76 of the first embodiment. Specifically, dross collecting plates 134 and 136 include replaceable top and side bronze plates 138, 140, and 142, 144, respectively.

When actuated, cylinders 122 and 124 bring clamps 126 and 128 into tight engagement with the underside 145 of slab S, shown in FIG. 6. The reference numeral 146 in FIG. 6 designates a roller assembly for carrying freshly produced slabs S made by the casting machine C.

OPERATION

In operation, slab S is positioned on rollers of clamp assemblies 10 and 12, FIG. 2. The clamp plates 14, 16, 18 and 20 of assembly 10, as well as the clamp plates 54, 56, 58 and 60 of clamp assembly 12, are pivoted about axes x and y, respectively, by actuating cylinders 42, 92 and 98. As shown in FIG. 2, in the unclamped position there is clearance 148 between underside 145 of slab S and the dross collecting plates 36 and 76. However, when the clamps 10 and 12 are pivoted outwardly, shown by arrows z in FIG. 2, so as to bring them into tight engagement with the underside 145 of slab S, the clearance disappears, as the clamps 10 and 12 exert a tight pressure on the underside 145 of slab S, and dross collecting plates 36 and 76 are in tight engagement with the slab underside, FIG. 3. Typically, slab S would be placed on the apparatus A such that the plane of the kerf line, shown by k in FIG. 3, vertically extends throughout the clearance 109 between dross collecting plates 36 and 76. Preferably, clearance 109 is kept at a level of about ⅛ inch. The burner torch T is then lowered toward slab S for cutting it into two pieces.

Figure 4:
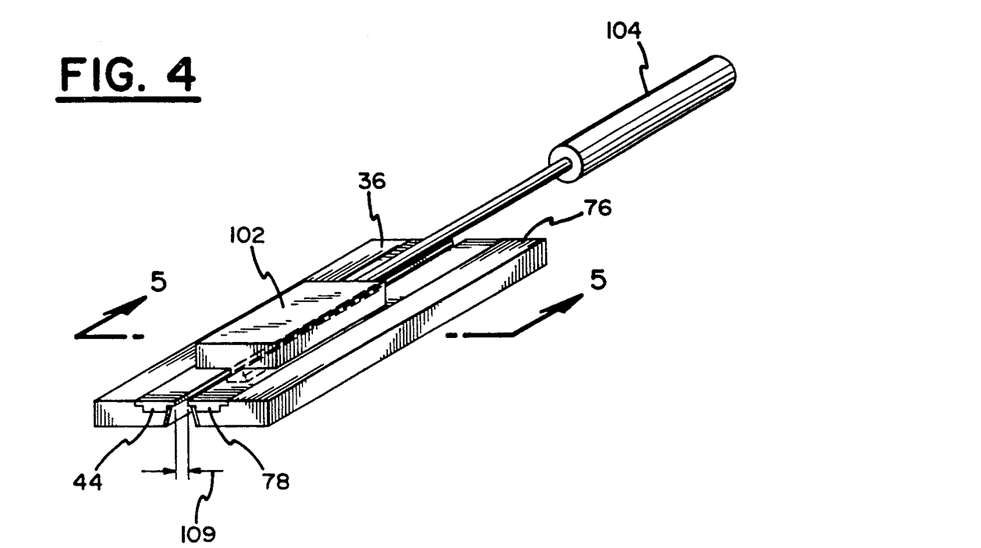
FIG. 4 illustrates a device for cleaning the clamps, shown with the dross collecting plates.

During the cutting operation, dross D is either deflected by, or adheres to sides 110 and 112 of collecting plates 50 and 84, FIG. 3. Upon completion of the cutting operation, dross D is easily broken-off from slab S by moving the slab pieces p,p on the roller table, and dross deposit D, adhering to the plates 50 and 84 is easily removed by hydraulically actuating cleaning device 102, FIGS. 4-5.

As described above, the alternate embodiment of the apparatus AA of the invention shown in FIGS. 6-9, is used in conjunction with a continuous caster torch cut-off machine C. Typically, a freshly formed slab S is rolled-off the machine and positioned under torch-cutting assembly 111 by roller assembly 146 to be cut into pieces of desired dimensions. The guillotine 118 and 120, supporting clamps 126 and 128 thereon, are moved-up by actuating cylinders 122 and 124 so that clamps 126 and 128 tightly engage the underside 145 of slab S, FIG. 6. The slab S is then cut by lowering torch T. As in the previous embodiment, the dross formed during the cutting operation is deposited on plates 140 and 144, and/or 138 and 142, of clamps 126 and 128, and is easily removed therefrom by sliding a cleaning device 102 in clearance space 150 therebetween.

As can be seen from the above, the formation of any dross along the cut edges of slab S and on the underside thereof is prevented during the cutting operation.

While this invention has been described as having a preferred design, it is understood that it is capable of further modifications, uses and/or adaptations following in general the principle thereof and including such departures from the present disclosure as come within the known or customary practice in the art to which the invention pertains and as may be applied to the central features hereinbefore set forth, and fall within the scope of the invention and of the limits of the appended claims.

What is claimed is:

1. A torch-cutting apparatus for slabs to prevent dross from forming on the underside of the slabs in the area of a cut, comprising:
   a) means to be positioned beneath a slab for applying a tight clamping pressure to the underside of said slab in the area of the cut during a cutting operation thereby preventing dross from flowing laterally and forming on the underside of said slab in the area of the cut during said cutting operation;
   b) said clamping pressure applying means includes laterally spaced first and second clamps to be positioned on either side of a kerf line; and
   c) each of said first and second clamps is pivotable between clamped and unclamped positions.

2. A torch-cutting apparatus for slabs to prevent dross from forming on the underside of the slabs in the are of a cut, comprising:
   a) means to be positioned beneath a slab for applying a tight clamping pressure to the underside of said slab in the area of the cut during a cutting operation thereby preventing dross from flowing laterally and forming on the underside of said slab in the area of the cut during said cutting operation;
   b) said clamping pressure applying means includes laterally spaced first and second clamps to be positioned on either side of a kerf line;
   c) each of said first and second clamps is pivotable between clamped and unclamped positions;
   d) said first clamp is pivotable about a first pivoting axis;
   e) said second clamp is pivotable about a second pivoting axis;
   f) said first and second axes are generally parallel to each other;
   g) said first clamp includes a central longitudinal axis; and
   h) said first pivoting axis is eccentric to said central axis of said first clamp.

3. A torch-cutting apparatus for slabs to prevent dross from forming on the underside of the slabs in the area of a cut, comprising:
   a) means to be positioned beneath a slab for applying a tight clamping pressure to the underside of said slab in the area of the cut during a cutting operation thereby preventing dross from flowing laterally and forming on the underside of said slab in the area of the cut during said cutting operation;
   b) said clamping pressure applying means includes laterally spaced first and second clamps to be positioned on either side of a kerf line;
   c) each of said first and second clamps is pivotable between clamped and unclamped positions;
   d) said first clamp is pivotable about a first pivoting axis;
   e) said second clamp is pivotable about a second pivoting axis;
   f) said first and second axes are generally parallel to each other;
   g) each of said first and second clamp includes a central longitudinal axis; and
   h) said first and second pivoting axes are eccentric to the corresponding central axes of said first and second clamps.

4. A torch-cutting apparatus for slabs to prevent dross from forming on the underside of the slabs in the area of a cut, comprising:
   a) means to be positioned beneath a slab for applying a tight clamping pressure to the underside of said slab in the area of the cut during a cutting operation thereby preventing dross from flowing laterally and forming on the underside of said slab in the area of the cut during said cutting operation;
   b) means for selectively positioning said clamping pressure applying means in tight engagement with the underside of said slab; and
   c) said positioning means includes hydraulic actuating means operably connected to said clamping pressure applying means.

5. An apparatus for torch-cutting slabs and removing dross from a dross receiving surface extending along the underside of the slab comprising:
   a) conveyor means for supporting a slab and moving the slab along a longitudinal axis;
   b) torch means positioned above said conveyor means for cutting through the slab in a downward direction to cut the slab into a desired number of pieces thereby producing dross on the dross receiving surface of the slab during a cutting operation;
   c) dross removing means having upper and lower surfaces, said dross removing means positionable adjacent to and beneath said conveyor means for removing from the dross receiving surface the dross formed thereon during said cutting operation; and
   d) said dross removing means including a dross removing member movable transversely to the longitudinal axis of said conveyor means, said dross removing member is disposed only on said dross removing means upper surface so as to only remove dross from the underside of the slab.

6. A method for torch-cutting slabs and removing dross from a dross receiving surface extending along the underside of the slab, comprising the steps of:
   a) providing a slab on a conveyor means for supporting and moving the slab along a longitudinal axis;
   b) providing a torch-cutting means positioned above the slab supported on the conveyor means;
   c) moving the torch-cutting means in a downward direction to cut the slab into a desired number of pieces thereby producing dross on the dross receiving surface of the slab;
   d) moving the torch-cutting means away from the slab pieces; and
   e) removing from the dross receiving surface the dross formed thereon during the cutting step using a dross removing means having upper and lower surfaces and which is positionable adjacent to and beneath the conveyor means, the dross removing means includes a dross removing member movable transversely to the longitudinal axis of the conveyor means and disposed only on the dross removing means upper surface so as to only remove dross from the underside of the slab.

7. The apparatus of claim 1, and including:
   a) means for moving a torch toward said slab for thereby cutting said slab in two pieces.

8. The apparatus of claim 1, wherein:
a) said first clamp is pivotable about a first pivoting axis;
b) said second clamp is pivotable about a second pivoting axis; and
c) said first and second axes are generally parallel to each other.

9. The apparatus of claim 1, and including:
a) means for pivoting said first and second clamps between said clamped and unclamped positions.

10. The apparatus of claim 9, wherein:
a) said pivoting means includes at least one hydraulic cylinder.

11. The apparatus of claim 1, and including:
a) means operably connected to said clamping pressure applying means for receiving dross formed during said cutting operation.

12. The apparatus of claim 11, wherein:
a) said dross receiving means includes first and second plate members rigidly connected to said clamping pressure applying means.

13. The apparatus of claim 12, wherein:
a) at least one of said first and second plate members includes a replacement die member.

14. The apparatus of claim 11, and including:
a) means for removing dross deposit from said dross receiving means operably connected thereto.

15. The apparatus of claim 1, and including:
a) means for supporting said slab during said cutting operation operably connected to said clamping pressure applying means.

16. The apparatus of claim 15, wherein:
a) said slab supporting means includes laterally spaced first and second roller means to be positioned on either side of a kerf line.

17. The apparatus of claim 1, wherein:
a) said first and second clamps are laterally spaced from each other so as to define a predetermined clearance therebetween.

18. The apparatus of claim 17, wherein:
a) said clearance is about ⅛ inch.

19. The apparatus of claim 1, and including:
a) means for selectively positioning said clamping pressure applying means in tight engagement with the underside of said slab.

20. The apparatus of claim 15, wherein:
a) said clamping pressure applying means includes laterally spaced first and second clamps to be positioned on either side of a kerf line.

21. The apparatus of claim 1, in combination with a slab casting machine.

22. A method of torch-cutting a slab to prevent dross from forming on the underside of the slab in the area of a cut, comprising the steps of:
a) providing a slab with top and undersides;
b) positioning beneath said slab a means for applying a tight clamping pressure to the underside of said slab in the area of the cut;
c) applying a tight clamping pressure by actuating said clamping pressure applying means;
d) providing and moving a torch-cutting means toward said slab;
e) cutting said slab into two pieces; and
f) moving said torch-cutting means away from said slab;
g) whereby any dross formed during the cutting step is deposited on said clamping pressure applying means and any dross deposit on said slab pieces is prevented.

23. The method of claim 22, including the step of:
a) removing dross deposited on said clamping pressure applying means.

24. The method of claim 22, including the step of:
a) breaking free from said slab dross formed on said clamping pressure applying means by moving said slab pieces.

25. The method of claim 22, wherein:
a) said clamping pressure applying means includes first and second laterally spaced clamps; and
b) said first and second clamps include means for switching between clamped and unclamped positions.

26. The method of claim 22, wherein:
a) said clamping pressure applying means includes means for receiving dross formed during the cutting step.

27. The method of claim 22, wherein:
a) said slab providing step is carried out by producing a slab by a slab casting machine.

28. The method of claim 22, wherein:
a) said torch-cutting step is carried out in conjunction with producing a slab by a slab casting machine.

29. The apparatus of claim 5, wherein:
a) said movable member includes an arm and a cleaning ram affixed to said arm.

30. The method of claim 6, wherein:
a) said dross removing means includes an arm and a cleaning ram affixed to said arm.

* * * * *